United States Patent [19]

Weston

[11] 4,322,749
[45] Mar. 30, 1982

[54] SIGNAL GENERATOR FOR TELEVISION TESTING

[75] Inventor: Martin Weston, Epsom, England

[73] Assignee: British Broadcasting Corporation, London, England

[21] Appl. No.: 151,001

[22] Filed: May 19, 1980

[30] Foreign Application Priority Data

May 22, 1979 [GB] United Kingdom ............... 17818/79

[51] Int. Cl.³ ............................................. H04N 5/13
[52] U.S. Cl. .................................................. 358/139
[58] Field of Search .................................. 358/10, 139

*Primary Examiner*—Robert L. Richardson

*Attorney, Agent, or Firm*—Robert F. O'Connell

[57] ABSTRACT

A television test signal generator generates a test signal comprised of varying sinusoidal components each of which has a phase defined by the equation:

$$\phi = k_\phi + k_t \cdot t + k_t 2 \cdot (t^2/2) + k_y \cdot y + k_{yt} \cdot y \cdot t + k_y 2 \cdot (y^2/2) + k_x \cdot x + k_{xt} \cdot x \cdot t + k_{xy} \cdot x \cdot y + k_x 2 \cdot (x^2/2)$$

The use of more complex terms enables more sophisticated qualities of the television equipment to be gauged. The signal can be generated with the use of appropriate accumulators.

7 Claims, 7 Drawing Figures

$\phi = k_x \cdot x \, (+k_t \cdot t)$

$\phi = k_y \cdot y \, (+k_t \cdot t)$

$\phi = k_{x2} \cdot \frac{x^2}{2} \, (+k_t \cdot t)$

$\phi = k_{y2} \cdot \frac{y^2}{2} \, (+k_t \cdot t)$

$\phi = k_{y2} \cdot \frac{y^2}{2} + k_{xt} \cdot x \cdot t$

$\phi = k_{x2} \cdot \frac{x^2}{2} + k_{yt} \cdot y \cdot t$ $$\phi = k_x \cdot x + k_y \cdot y \, (+k_t \cdot t)$$

$$\phi = k_{xy} \cdot x \cdot y \, (+k_t \cdot t)$$

$$\phi = k_{x^2} \cdot \frac{x^2}{2} + k_{xy} xy + k_{y^2} y^2 (+k_t \cdot t)$$

$$\left( k_{xy}^2 = k_{x^2} \cdot k_{y^2} \right)$$

FIG. 4B $$\phi = k_{x^2} \cdot \frac{x^2}{2} + k_{y^2} \cdot \frac{y^2}{2} (+k_t \cdot t)$$

$$\phi = k_{x^2} \cdot \frac{x^2}{2} - k_{y^2} \frac{y^2}{2} (+k_t \cdot t)$$

SIGNAL GENERATOR FOR TELEVISION TESTING

This invention relates to a signal generator for testing television equipment by generating a pattern which is displayed on the television screen and from which the qualities of the equipment can be gauged.

The present invention is defined in the appended claims, to which reference should now be made.

The invention will be described by way of example with reference to the drawings, in which:

FIGS. 2A and 2B, which may be placed one above the other to form a composite FIG. 2, show the arrangement of nine accumulators in the signal generator;

FIGS. 3A and 3B, which may be placed side by side to form a composite FIG. 3, show an overall block diagram of the signal generator.

The television signal generator to be described displays the frequency response of a television system in 3 dimensions, i.e. horizontal frequency, vertical frequency and temporal frequency. Unlike the more familiar test signals, such as line sweep, multiburst or test card resolution bars which contain only stationary vertical gratings, the generator can produce gratings not only of varying pitch but also of varying slope and moving at varying speeds. These sloping and moving patterns are desirable for testing sophisticated video processors which combine signals from different scan lines and/or different fields, e.g. vertical aperture correctors, comb filter coders, sub-Nyquist sampling systems, noise reducers, and standards converters.

The preferred generator can either produce gratings of fixed pitch, slope and speed, or it can vary the parameters smoothly from one part of the screen to another and from one picture to another to give a frequency sweep in up to 3 dimensions. At maximum sweep rates it is possible to display the entire range of spatio-temporal frequencies in about 10 seconds. By reducing the sweep rates and adjusting the centre frequencies it is possible to examine each part of the spectrum in more detail.

First the principles of operation of the preferred signal generator embodying the invention will be described.

The generator is digital and operates at a line-locked sampling frequency of approximately 13.3 MHz, although this could easily be changed. It produces sine waves by using a read-only-memory (ROM), whose input represents the phase of the signal at each sampling point. It will be appreciated that in principle any desired periodic waveshape can be formed. Square waves and gamma-corrected sine waves are of particular interest.

The phase, $\phi$, is calculated according to the following general second degree equation in x, y and t (horizontal position, vertical position and time):

$$\phi = k_\phi + k_t \cdot t + k_{t2} \cdot (t^2/2) + k_y \cdot y + k_{yt} \cdot y \cdot t + k_{y2} \cdot (y^2/2) + k_x \cdot x + k_{xt} \cdot x \cdot t + k_{xy} \cdot x \cdot y + k_{x2} \cdot (x^2/2) \quad (1)$$

By adjusting the ten coefficients (k's) in this equation, it is possible to control the sweep rates and centre frequencies of the resulting pattern.

Any spatio-temporal frequency can be resolved into three components; horizontal, vertical and temporal. The horizontal component may be defined as the rate of change of phase in the horizontal direction:

$$\partial\phi/\partial x = k_x + k_{xt} \cdot t + k_{xy} \cdot y + k_{x2} \cdot x \quad (2)$$

Thus $k_x$ controls the initial horizontal frequency component, and $k_{xt}$, $k_{xy}$ and $k_{x2}$ control the rates at which this component of the frequency varies with time, vertical position and horizontal position respectively.

Similarly, the vertical frequency component is:

$$\partial\phi/\partial y = k_y + k_{yt} \cdot t + k_{y2} \cdot y + k_{xy} \cdot x \quad (3)$$

and the temporal frequency component is:

$$\partial\phi/\partial t = k_t + k_{t2} \cdot t + k_{yt} \cdot y + k_{xt} \cdot x \quad (4)$$

So vertical and temporal frequency components can also be made to vary with position and time. Note, however, that these three equations are not completely independent. For example, the horizontal component $\partial\phi/\partial x$ and the vertical component $\partial\phi/\partial y$ are both functions of $k_{xy}$, which thus controls both the vertical variation of the horizontal frequency component and the horizontal variation of the vertical frequency component. Similarly $k_{xt}$ controls both the horizontal variation of the temporal component $\partial\phi/\partial t$ and the temporal variation of horizontal component $\partial\phi/\partial x$. Also, $k_{yt}$ controls both the vertical variation of the temporal component and the temporal variation of the vertical component.

Despite the above restrictions, it is possible to generate some very useful test patterns, including the following:

(1) Constant spatio-temporal frequencies ($\phi = k_x \cdot x + k_y \cdot y + k_t \cdot t$).

(2) Hyperbolic zone plates ($\phi = k_{xy} x \cdot y$). This is a two-dimensional frequency sweep in which the horizontal frequency component depends on the vertical position; and the vertical frequency component depends on the horizontal position. The pattern contains all possible spatial frequencies, but it lacks the obvious symmetry of the circular zone plate.

(3) Circular or eliptical zone plates ($\phi = k_{x2} \cdot x^2/2 + k_{y2} \cdot y^2/2$) consisting of concentric circles (or elipses) becoming steadily closer together away from the centre. This is also a two-dimensional frequency sweep containing all possible spatial frequencies. The horizontal frequency component depends on the horizontal position; and the vertical frequency component depends on the vertical position. Because of its obvious circular symmetry the circular zone plate is easy to understand and is probably the most useful two-dimensional frequency sweep pattern. Until now circular zone plates were only available as optical test cards from which inevitably imperfect signals were obtained by TV cameras or slide scanners.

(4) Any other conic section zone plate ($\phi = k_{x2} \cdot x^2/2 + k_{xy} \cdot x \cdot y + k_x \cdot x + k_{y2} \cdot y^2/2 + k_y \cdot y$) such as parabolas and non-rectangular hyperbolae.

(5) Moving patterns. By adding $k_t \cdot t$ any of the above stationary patterns can be made to move at a constant frequency.

(6) Accelerating patterns. By adding $k_{t2} \cdot t^2/2$ any of the above can be made to move at a rate which steadily increases from stationary to 25 Hz and back again. For example:

$$\phi = k_{x2} \cdot x^2/2 + k_{y2} \cdot y^2/2 + k_{t2} \cdot t^2/2$$

is the logical extension of the circular zone plate and can be named the 'spherical zone plate'

(7) A sweep of vertical and temporal frequency displayed on vertical and horizontal axes (e.g. zero vertical frequency at top, high vertical frequency at bottom of picture; stationary at the left moving to the right). This moving pattern could be extremely valuable for testing and displaying the characteristics of field store standards converters:

$$(\phi = K_{y2} \cdot y^2/2 + k_{tx} \cdot t \cdot x \cdot)$$

This pattern is thought to be particularly important.

(8) A sweep of horizontal and temporal frequency displayed in horizontal and vertical axes:

$$(\phi = K_{x2} \cdot x^2/2 + k_{ty} \cdot t \cdot y \cdot)$$

In order to generate the required patterns, the generator must calculate the phase $\phi$ according to equation (1) for each sampling point in the picture. If the sampling frequency is line locked so that the sampling points are vertically aligned, then x can be defined as the number of samples from the left-hand side picture, y can be defined as the number of lines from the top of the picture and t as the number of fields since last reset by the operator. Because of interlace, y increases each line in steps of two, so that for one of the two interlaced fields y is even and for the other field y is odd. (Assigning a fixed value of y to the whole of each scanning line and a fixed value of t to the whole of each field is an admissible simplification).

The values of x, y and t for each sample could be generated by element, line and field rate counters and the phase $\phi$ calculated by multiplication and addition according to equation (1). Multiplication is one of the most difficult operations to perform, so the sweep generator avoids the use of multipliers by generating each of the terms in equation (1) as follows.

The number $k_t \cdot t$ increases each field during field blanking by the amount $k_t$. It can, thus, be generated by an accumulation circuit which stores the present value of $k_t \cdot t$ and adds $k_t$ to it during each field blanking period. Similarly $k_y \cdot y$ can be generated by an accumulator which stores the present value and adds $2 \cdot k_y$ to it during each line blanking period; the accumulator being reset at the top of each picture to values differing by $k_y$ on odd and even fields. Similarly, $k_x \cdot x$ is generated by an accumulator which adds $k_x$ once per sample and is reset at the beginning of each line.

Figure 1:
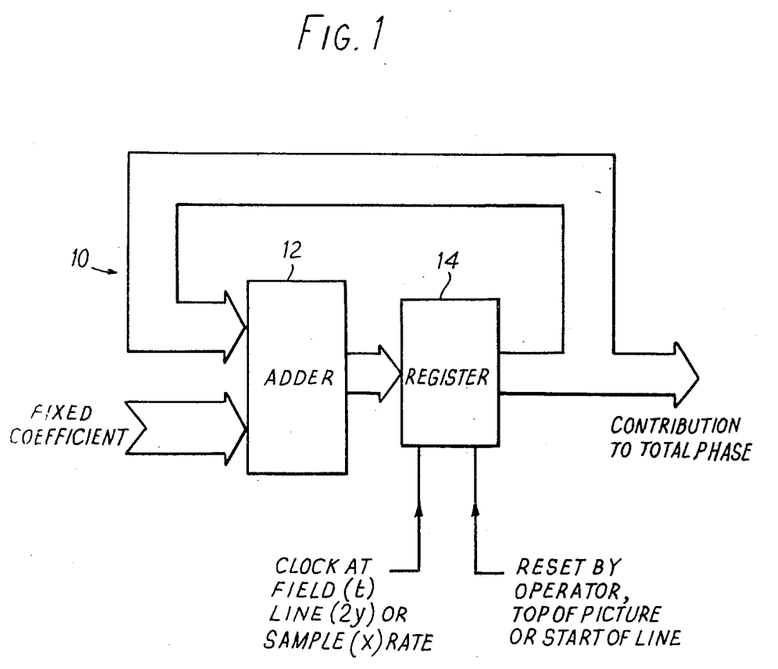
FIG. 1 is a basic accumulator circuit which can be used in a preferred signal generator embodying the invention.

An example 10 of such an accumulator circuit is given in FIG. 1 and is seen to consist of an adder 12 and a register 14 connected in a loop. The register is reset at the start of each line (x), the top of each field (y), or by the operator (t).

Generating the three 'cross-product' terms ($k_{xy} \cdot x \cdot y$, $k_{yt} \cdot y \cdot t$, and $k_{xt} \cdot x \cdot t$) is a two stage process. For example, $k_{xy} \cdot x \cdot y$ is a number which increases each sample by $k_{xy} \cdot y$, which itself is a number which increases by $2k_{xy}$ for each line of the field. The term $k_{xy} \cdot x \cdot y$ can thus be generated by an accumulator which is reset at the beginning of each line and then for each sample adds the output of an accumulator which is reset at the beginning of each field. $k_{yt} \cdot y \cdot t$ and $k_{xt} \cdot x \cdot t$ are generated in a similar manner.

The 'squared' terms are also generated by a two stage process. For example $\frac{1}{2}k_{x2} \cdot x^2$ increases each sample by $(k_{x2} \cdot x - \frac{1}{2}k_{x2})$ which increases each sample by $k_{x2}$. It is thus generated by two element-rate accumulators in tandem.

As the accumulations continue the phase will go through many complete cycles, but since only the fractional part is required to generate sine waves the accumulators need only count fractions of a cycle and can be allowed to overflow after each complete cycle.

As noted above, each of the terms in the phase equation of the 3-dimensional frequency sweep can be generated by accumulator circuits. If the terms were generated separately, a total of 15 accumulators would be required, one for each of the 3 first-order terms in x, y and t, and two for each of the 6 second order terms in xy, yt, xt, $x^2$, $y^2$ and $t^2$. It is however, possible to combine the operations so that only 9 accumulators are required in practice.

Figure 2A:
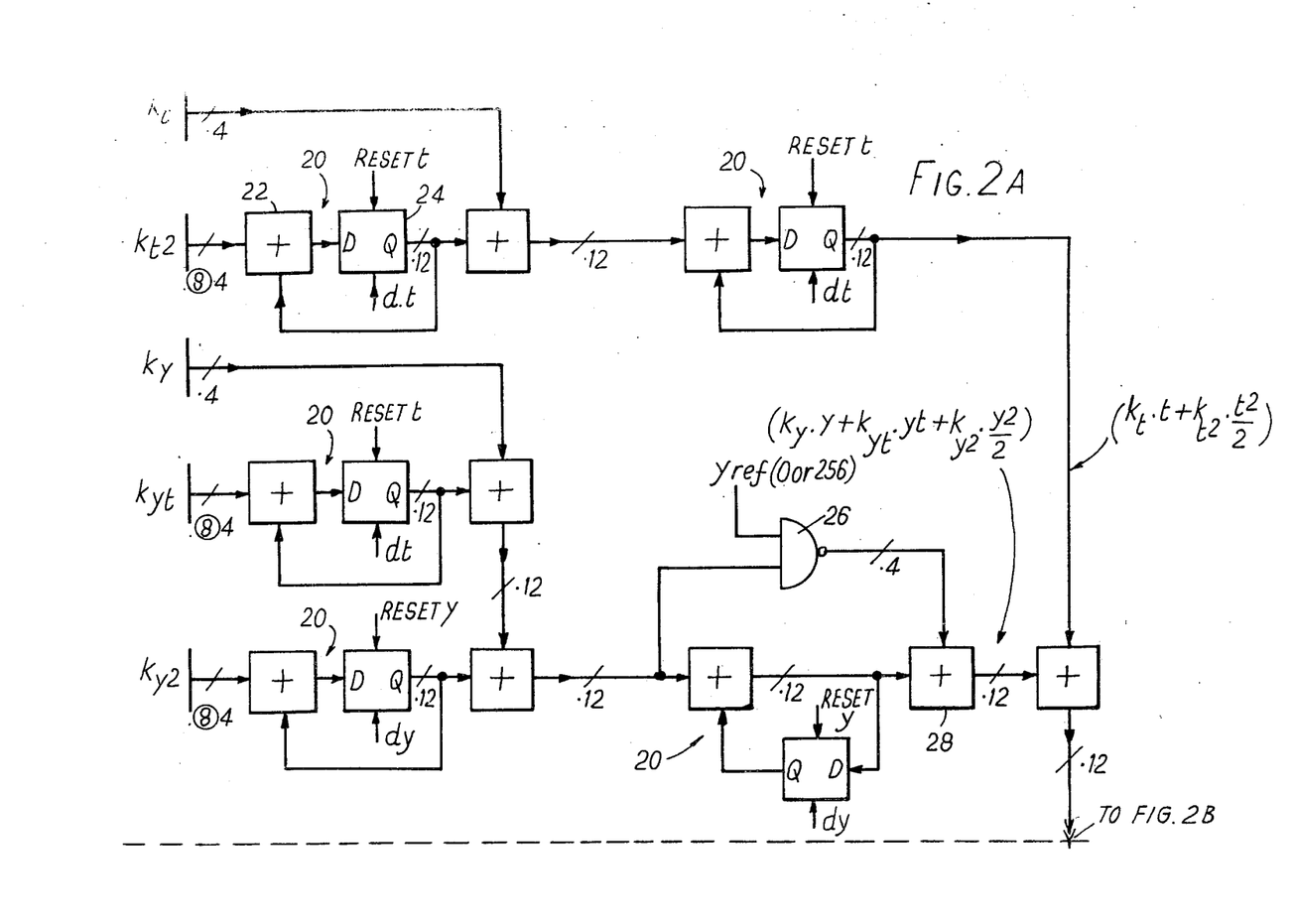
Figure 2B:
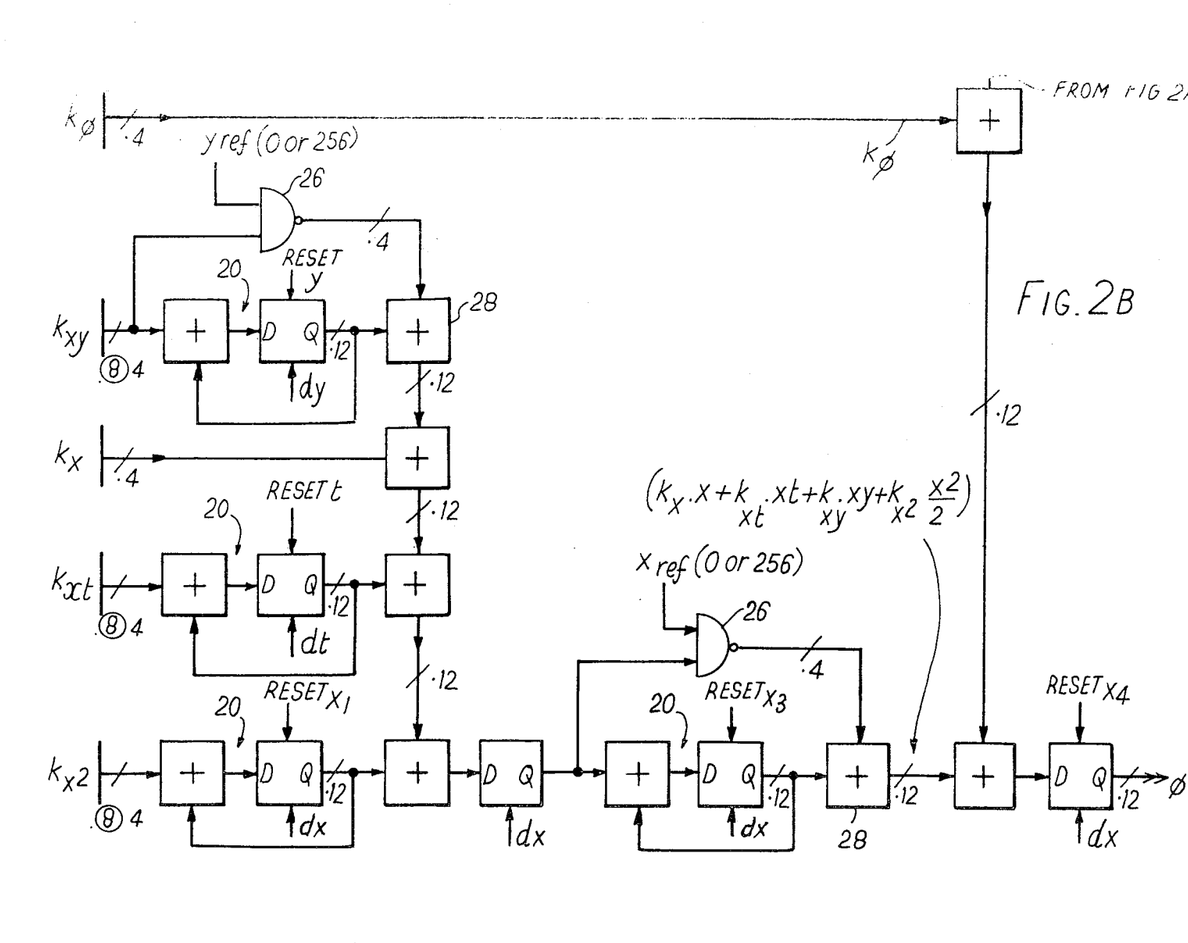

FIGS. 2A and 2B show a possible arrangement of the phase generator. Each of the 9 accumulators 20 consists of a 12 bit adder 22 and a 12 bit register 24 (instrumented with D-type flip-flops) The expressions dt, dy and dx represent clock pulses at field rate, twice line rate and element rate, respectively. Additional D-type flip-flops clocked at element rate are required merely to retime the data in high speed parts of the circuit. The three (4 bit) NAND gates 26 fed with $x_{ref}$ and $y_{ref}$ allow the origins of x and y to be moved from the top left-hand corner of the picture to a point 256 elements to the right and/or 256 lines down. These gates each subtract in an adder 28 from the output of an associated accumulator 256 times the input, so that the output only reaches zero after accumulating for 256 clock periods.

Figure 3A:
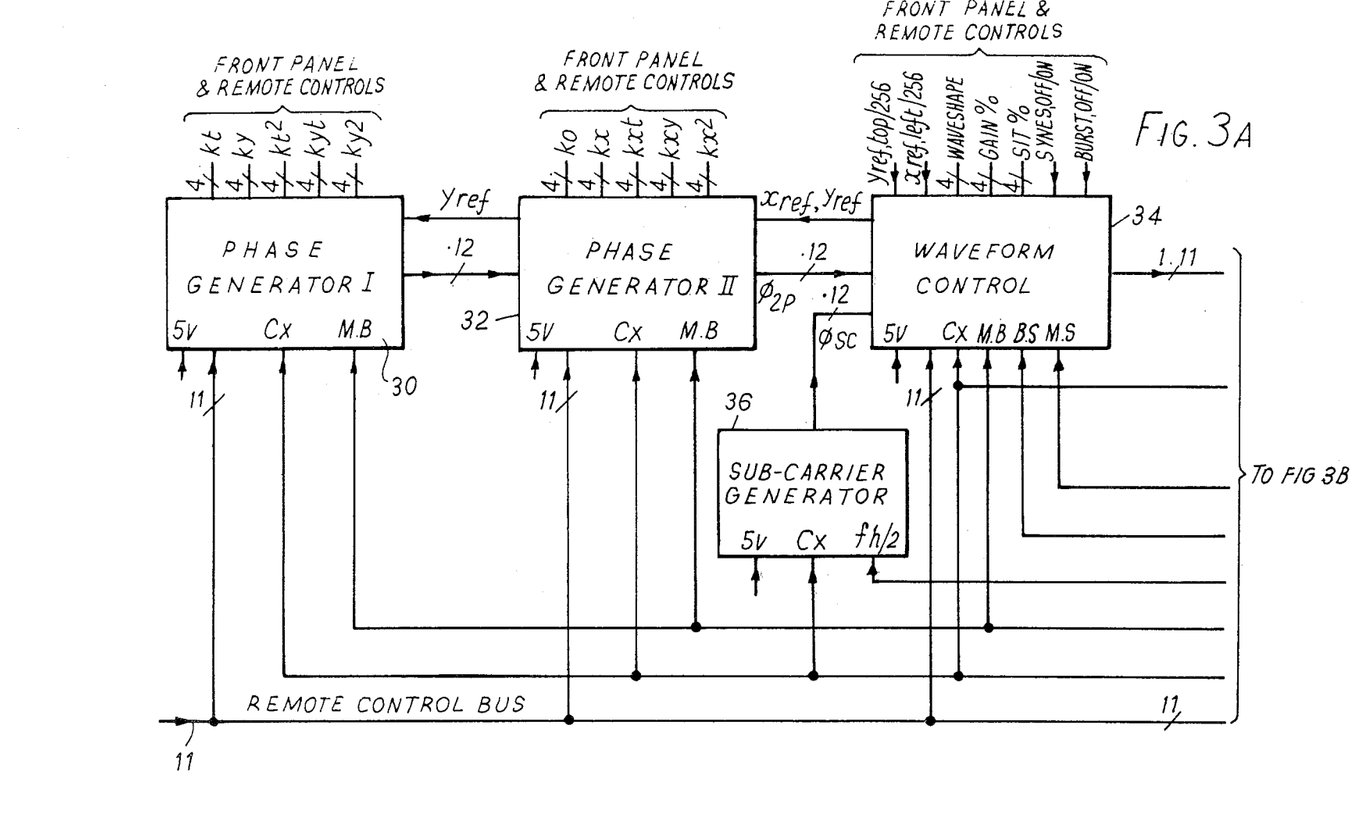
Figure 3B:
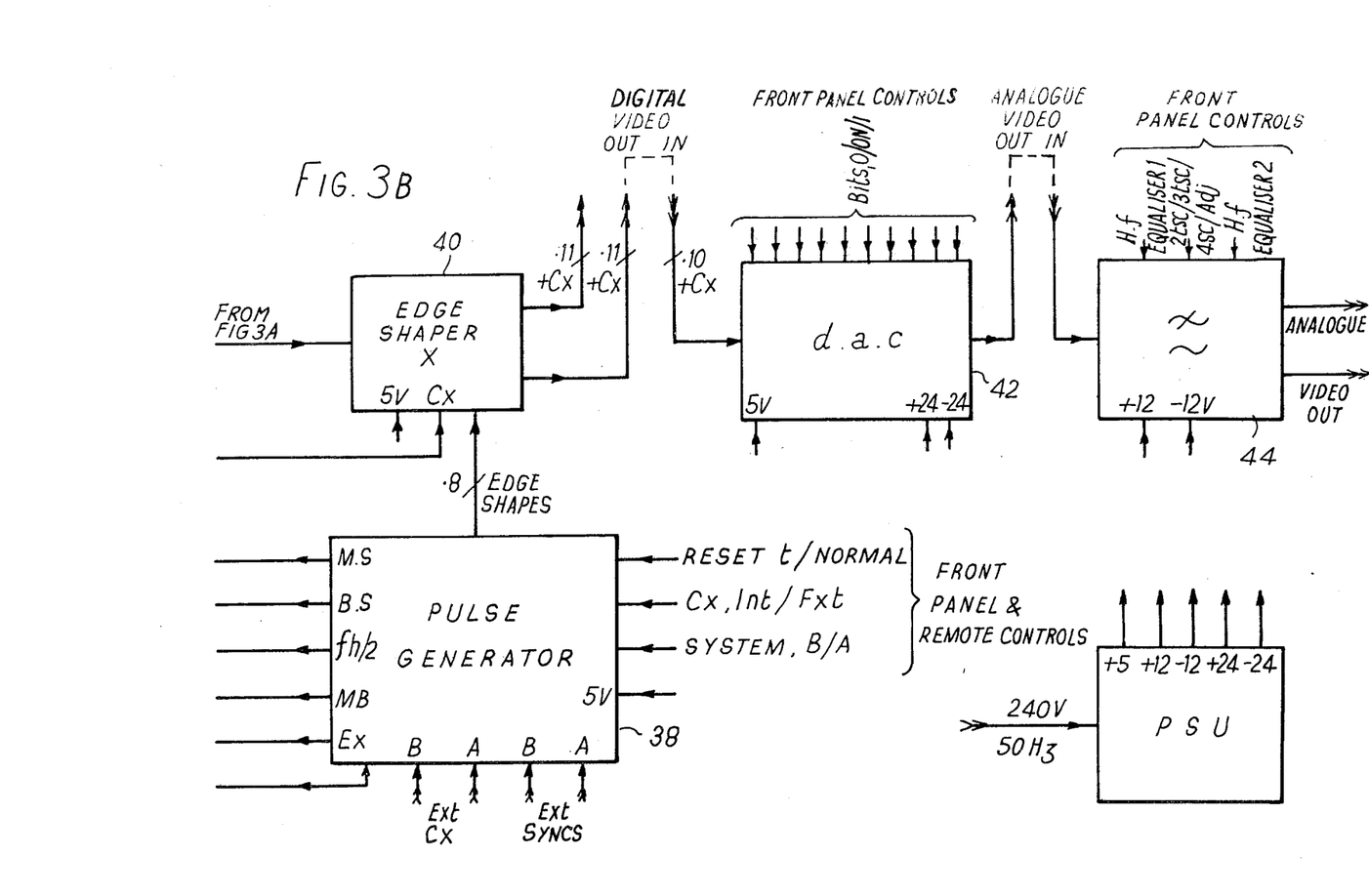

FIGS. 3A and 3B show the overall block diagram of the preferred equipment. The generation of the phase function occupies two printed circuit boards.

The output of the phase generators 30,32 passes to a waveform control board 34 whose main function is to generate sine waves by using the phase to address a Read Only Memory (ROM) programmed with the values of sin $\phi$. The waveform control board 34 also contains two other ROM's which can be programmed with any other function, e.g. gamma corrected sine waves (sin $1/8 \phi$). It can also generate simple functions such as square waves, sawtooth waves and triangular waves without the use of a ROM. The gain and sit level of the output can also be controlled. During the back porch period of the video signal, the input to the sin ROM is switched to the output of a subcarrier phase generator 36 circuit to produce a colour burst.

The waveform control board also gates in synchronising pulses from a pulse generator 38.

At the output of the waveform control board 34 the transitions between synchronising pulses, colour bursts and active picture are much more abrupt than called for by the TV system specification. An edge shaping circuit 40 makes the beginning and end of each sync pulse, colour burst and active line fade smoothly from black. So that this does not make each of these periods too short, the waveform control circuit is deliberately misadjusted to generate extra long syncs, bursts and active lines.

All of these operations are controlled by the pulse generator 38 which produces clock pulses at some convenient multiple of line frequency (e.g. $851 \times f_n$) and from them produces all the necessary control waveforms using counters and Read Only Memories.

The digital output of the edge shaper 40 may be used directly to test digital systems or be fed to an internal digital-to-analogue converter (d.a.c.) 42 and output filter 44 to produce an analogue test signal.

The generator illustrated is thus a very sophisticated and highly versatile piece of equipment. But it would still be a very valuable piece of test equipment even without sync and burst insertion and edge shaping.

Figure 4A:
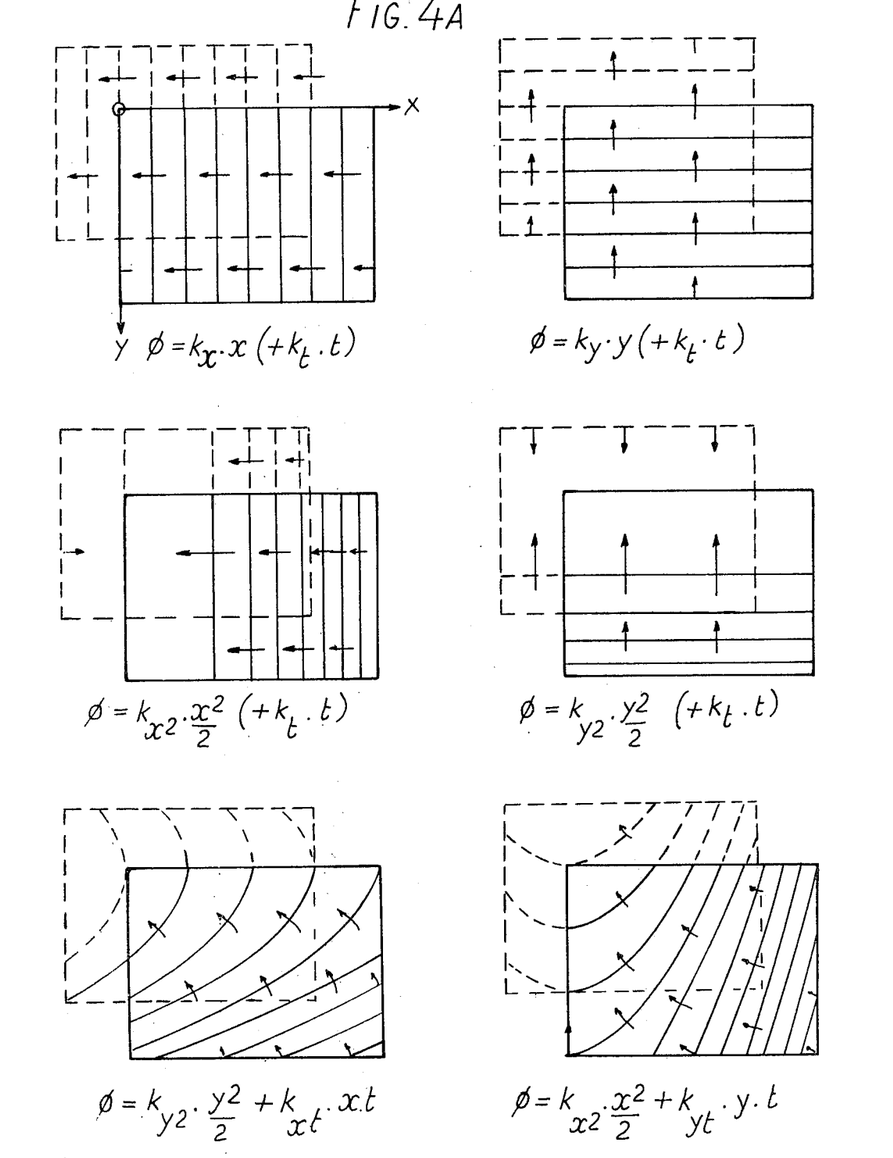
FIGS. 4A and 4B illustrate some of the patterns which can be achieved with the aid of the signal generator.
Figure 4B:
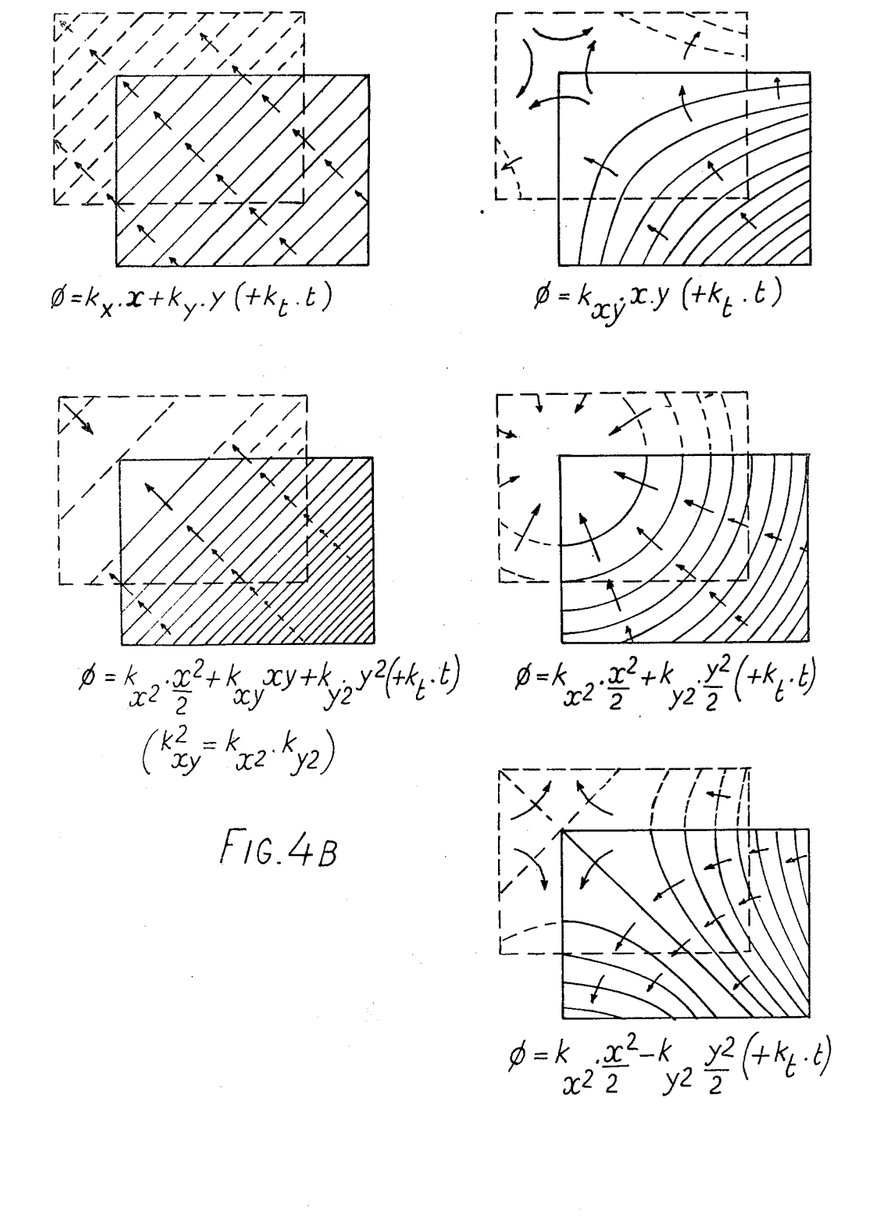

FIGS. 4A and 4B illustrate some of the most useful of the almost infinite variety of test patterns that the generator can produce. Each of the ten coefficients is controlled by a sixteen position switch, which gives a total of $10^{12}$ possible combinations. Each of the patterns shown may be positioned anywhere in the screen. An attempt has been made to illustrate this by showing the screen in two different positions; one with the top left-hand corner coincident with the centre of the pattern (i.e. $x=y=0$) and one (dotted) with it offset to show the area around the centre. The patterns are drawn with fine lines whereas the actual waveforms may be square, sawtooth, triangular, sine or any other waveshape that can be stored in a ROM.

The arrows indicate how the patterns move when the term $k_t \cdot t$ is added. The length of each arrow is proportional to the speed of movement. Adding the term $k_{t2} \cdot t^2$ makes the patterns move in the same way as shown, but the speed changes continuously with time. The first two patterns in the bottom row show the two moving patterns numbered (7) and (8) above.

It will be seen from the above that the signal generator can provide an extremely wide range of test patterns. Those which relate line to line and field to field terms, i.e. those concerned with vertical and temporal information, are especially useful in assessing the capabilities of the more sophisticated types of signal processing currently in use and envisaged. The ability to include more complex and varied terms than hitherto provides very real and practical advantages enabling a surprising and satisfying improvement to the permissible forms of testing to be obtained.

I claim:

1. A television test signal generator comprising
   means for generating television test signals comprising one more periodic waveforms; and
   means for controlling the phase $\phi$ of each of said one or more periodic waveforms in accordance with one or more terms of the following expression:

$$\phi = k_\phi + k_t \cdot t + k_{t2} \cdot t^2/2 + k_y \cdot y + k_{yt} \cdot y \cdot t + k_{y2} \cdot y^2/2 + k_x \cdot x + k_{xt} \cdot x \cdot t + k_{xy} \cdot x \cdot y + k_{x2} \cdot x^2/2$$

wherein x is a horizontal frequency component, y is a vertical frequency component, t is a temporal frequency component, and wherein each of the coefficients k have selectably controlled values, and further wherein the phase $\phi$ is not controlled solely in accordance with one or more of the terms $k_\phi$, $k_t \cdot t$, $k_y \cdot y$ and $k_x \cdot x$.

2. A generator according to claim 1, in which the phase $\phi$ varies at least with time.

3. A generator according to claim 1, in which the phase $\phi$ varies in dependence upon at least two of the cross-product or squared terms.

4. A generator according to claim 1, wherein said controlling means includes means for permitting the selection of one or more different terms to produce a test signal.

5. A generator according to claim 1, in which the generating means comprises one or more accumulator means for forming respective ones of the terms.

6. A generator according to claim 5 wherein each of said accumulator sections comprises
   adder means responsive to a fixed coefficient value and to an input signal for providing an adder output;
   register means responsive to said adder output, said adder output being clocked through said register at a selected rate to provide a register signal which is supplied as said input signal to said adder means and as a register output signal representing at least a part of one of said terms which form the phase $\phi$; and
   means for re-setting said register means.

7. A generator according to claim 1 wherein said controlling means controls the phase $\phi$ at least in accordance with the term $k_{t2} \cdot t^2/2$.

* * * * *